US010359986B2

(12) United States Patent
Leem et al.

(10) Patent No.: US 10,359,986 B2
(45) Date of Patent: Jul. 23, 2019

(54) MOBILE TERMINAL AND METHOD OF CONTROLLING THE SAME

(71) Applicant: LG ELECTRONICS INC., Seoul (KR)

(72) Inventors: Chaesung Leem, Seoul (KR); Hosoo Kim, Seoul (KR); Eulina Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 50 days.

(21) Appl. No.: 15/128,858

(22) PCT Filed: Nov. 3, 2014

(86) PCT No.: PCT/KR2014/010458
§ 371 (c)(1),
(2) Date: Sep. 23, 2016

(87) PCT Pub. No.: WO2015/147399
PCT Pub. Date: Oct. 1, 2015

(65) Prior Publication Data
US 2017/0115948 A1    Apr. 27, 2017

(30) Foreign Application Priority Data
Mar. 26, 2014    (KR) .................. 10-2014-0035499

(51) Int. Cl.
*G06F 3/14*    (2006.01)
*G06F 16/44*    (2019.01)
(Continued)

(52) U.S. Cl.
CPC ............ *G06F 3/1454* (2013.01); *G06F 3/165* (2013.01); *G06F 16/44* (2019.01); *G06F 16/68* (2019.01);
(Continued)

(58) Field of Classification Search
CPC .. G06F 3/1454; G06F 3/165; G06F 17/30058; G06F 17/30017; G06F 3/0488;
(Continued)

(56) References Cited

U.S. PATENT DOCUMENTS

2006/0083194 A1* 4/2006 Dhrimaj .............. H04M 1/7253
                                                              370/328
2008/0227384 A1* 9/2008 Placzek .............. H04N 21/4113
                                                              455/3.06
(Continued)

FOREIGN PATENT DOCUMENTS

KR    10-2012-0054236    5/2012

OTHER PUBLICATIONS

International Search Report and Written Opinion dated Feb. 12, 2015 issued in Application No. PCT/KR2014/010458 (Full English Text).

*Primary Examiner* — Abhishek Sarma
(74) *Attorney, Agent, or Firm* — KED & Associates, LLP

(57) ABSTRACT

A mobile terminal includes: a wireless communication unit configured to communicate with an external terminal wirelessly; and a controller configured to extract, when event information is received from the external terminal through the wireless communication unit, sound information related to the event, and transmit the extracted sound information to the external terminal such that the sound information is associated with at least one image related to the event of the terminal.

15 Claims, 14 Drawing Sheets

(51) Int. Cl.
    *H04W 88/02*     (2009.01)
    *H04N 21/414*     (2011.01)
    *H04N 21/4786*     (2011.01)
    *H04N 21/81*     (2011.01)
    *G06F 3/16*     (2006.01)
    *G06K 9/00*     (2006.01)
    *H04L 29/08*     (2006.01)
    *G06F 16/68*     (2019.01)
    *G06F 3/0488*     (2013.01)

(52) U.S. Cl.
    CPC .......... *G06K 9/00744* (2013.01); *H04L 67/02* (2013.01); *H04L 67/06* (2013.01); *H04N 21/41407* (2013.01); *H04N 21/4786* (2013.01); *H04N 21/8106* (2013.01); *H04W 88/02* (2013.01); *G06F 3/0488* (2013.01)

(58) Field of Classification Search
    CPC ..... H04L 67/02; H04L 67/06; G06K 9/00744; H04N 21/4786; H04N 21/8106; H04N 21/41407; H04W 88/02
    See application file for complete search history.

(56) References Cited

U.S. PATENT DOCUMENTS

| | | | |
|---|---|---|---|
| 2009/0150147 A1* | 6/2009 | Jacoby | G06F 17/30265 704/235 |
| 2011/0296484 A1* | 12/2011 | Harres | H04H 20/57 725/114 |
| 2012/0208514 A1* | 8/2012 | Park | G06F 3/0484 455/418 |
| 2012/0314091 A1* | 12/2012 | Yang | H04N 1/00281 348/207.1 |
| 2013/0190041 A1 | 7/2013 | Andrews et al. | |
| 2013/0203462 A1 | 8/2013 | Tahk et al. | |

\* cited by examiner

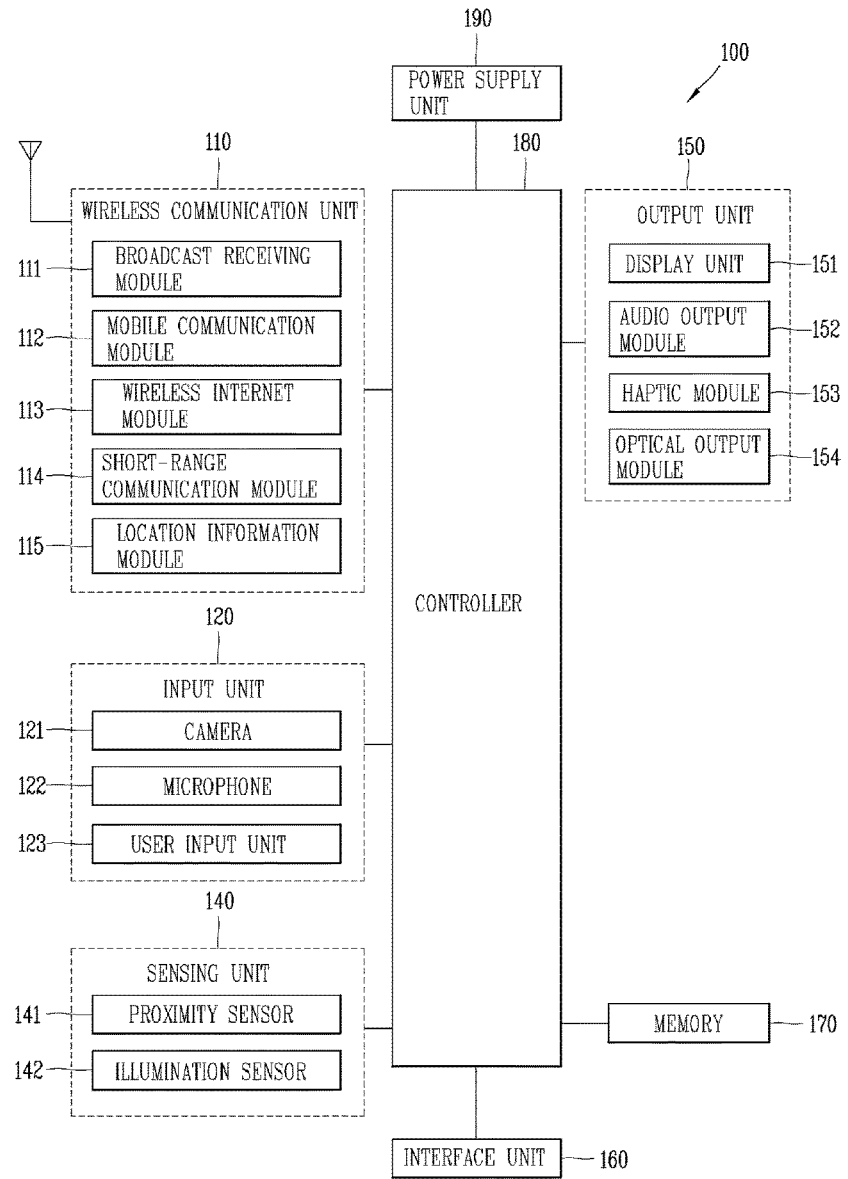
[Fig. 1a]
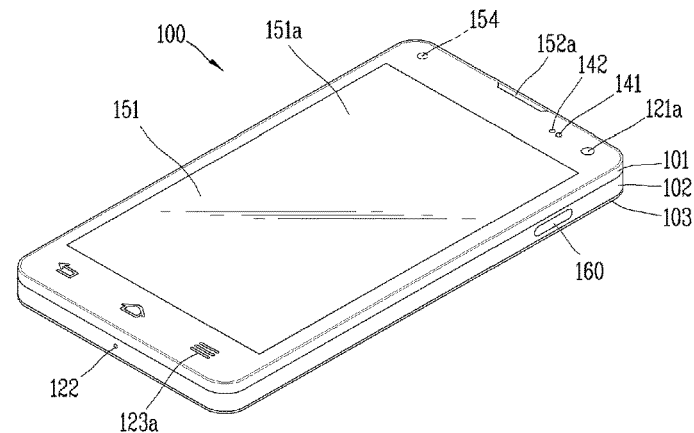
[Fig. 1b]

[Fig. 1c]
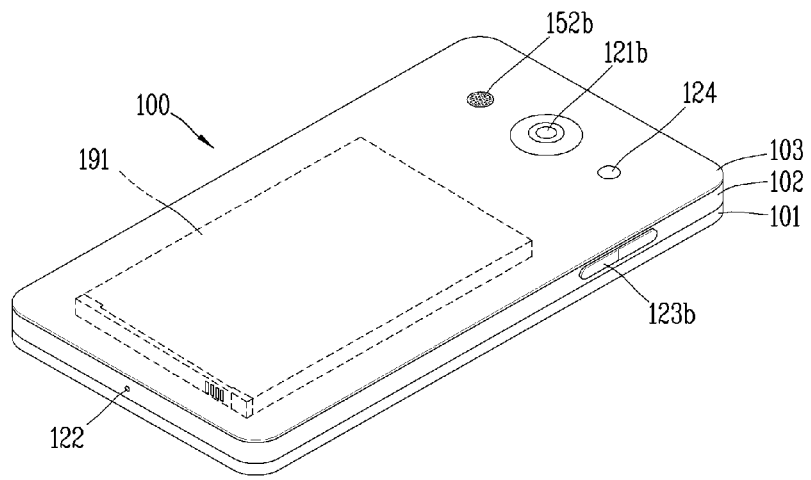
[Fig. 2]
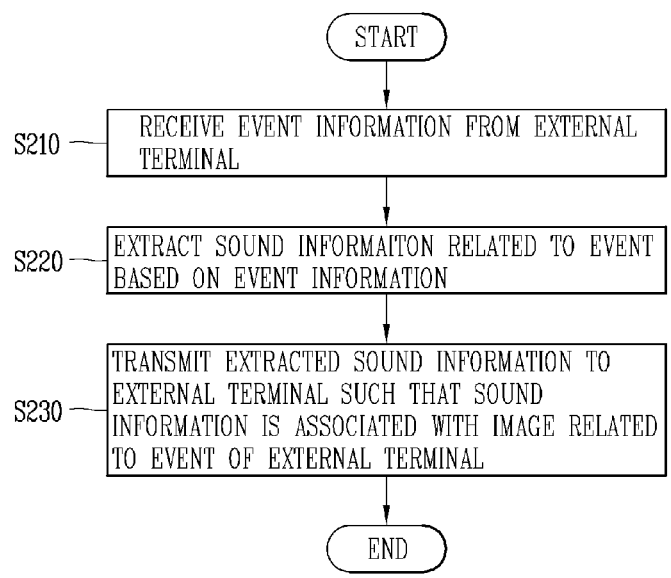

[Fig. 3]
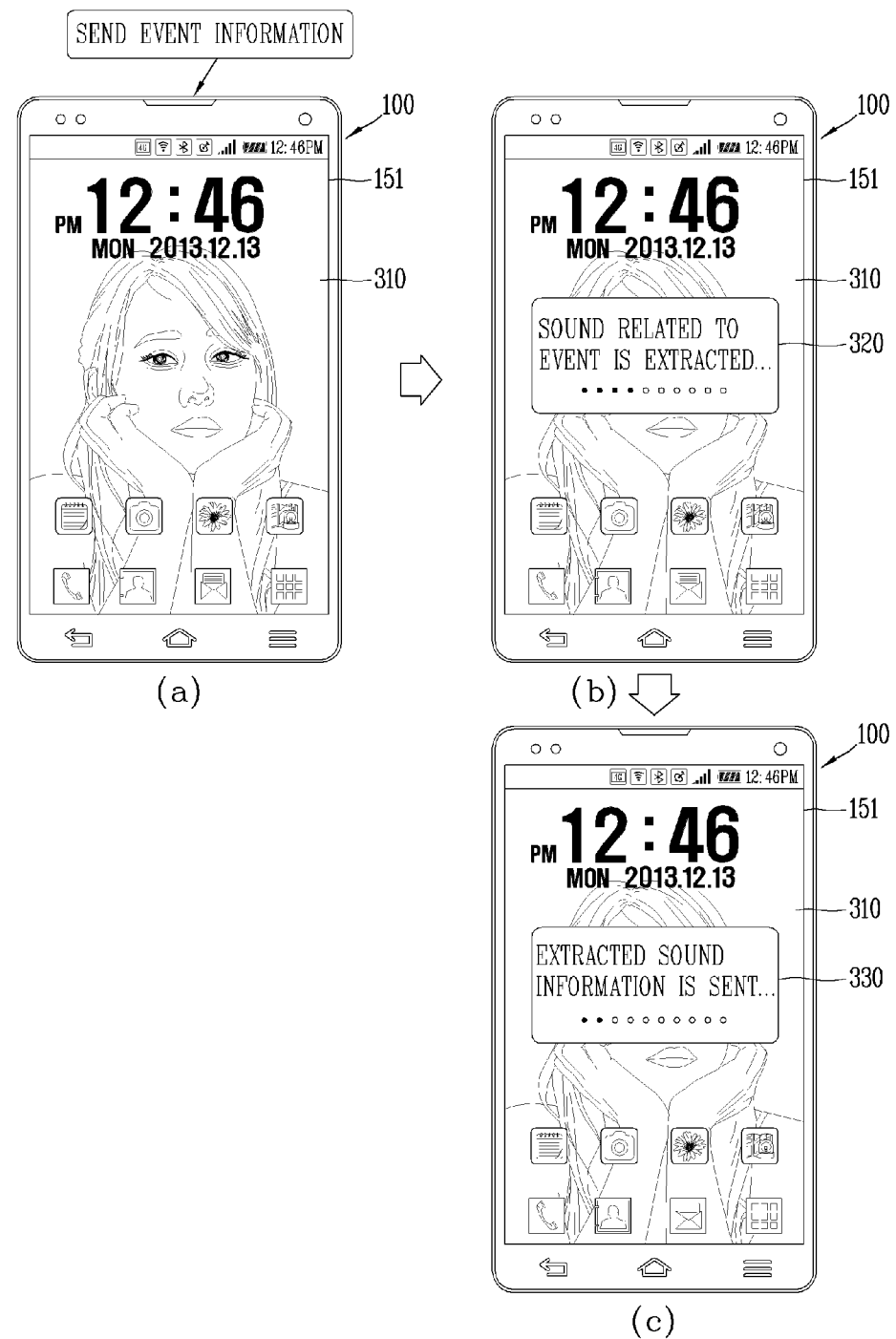

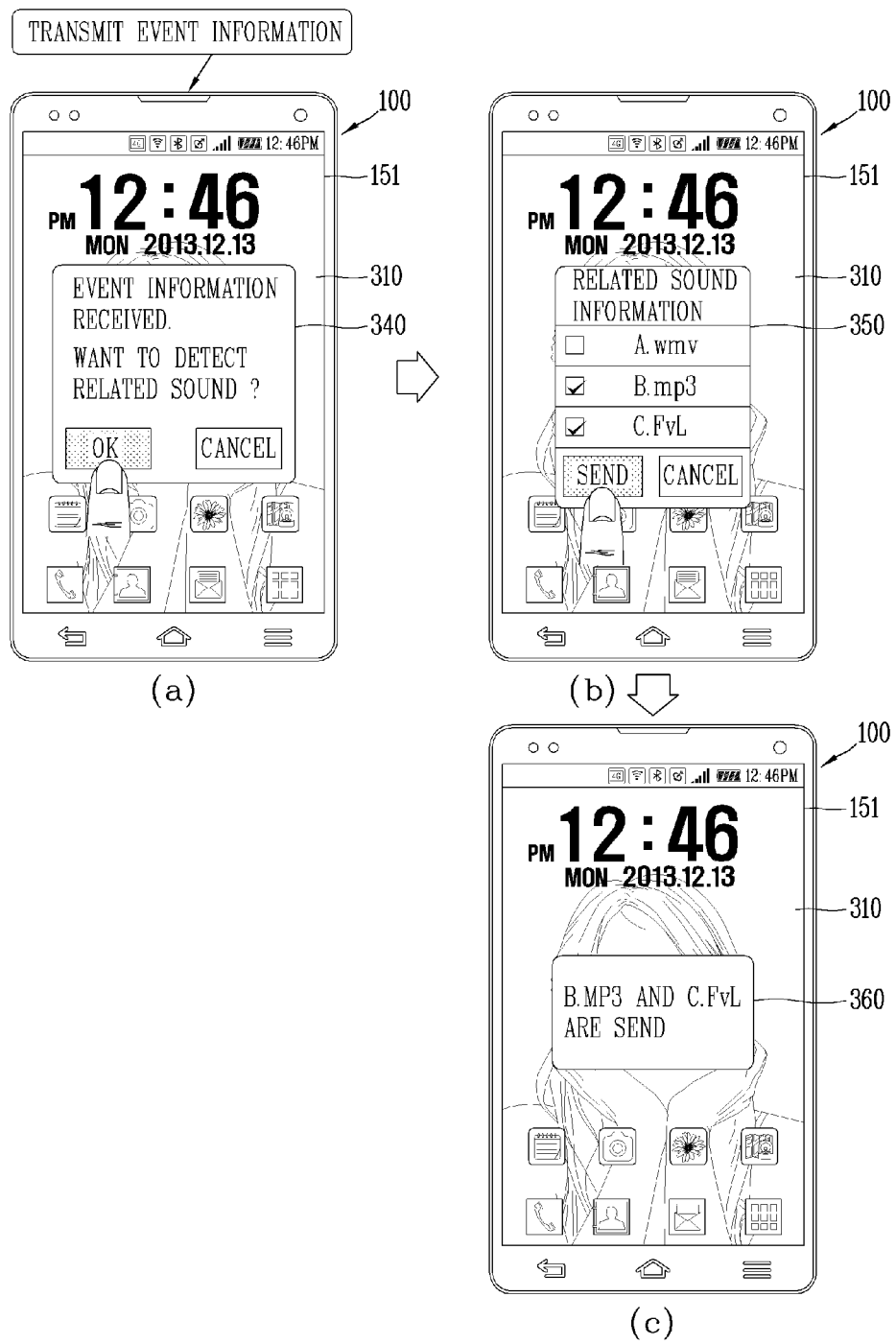

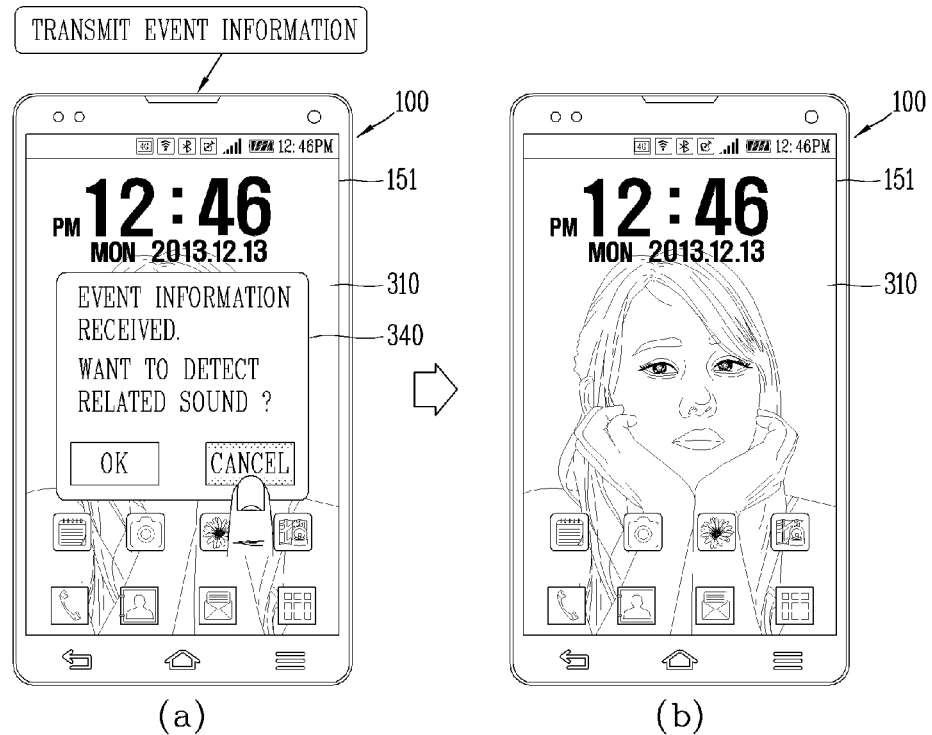
[Fig. 4b]
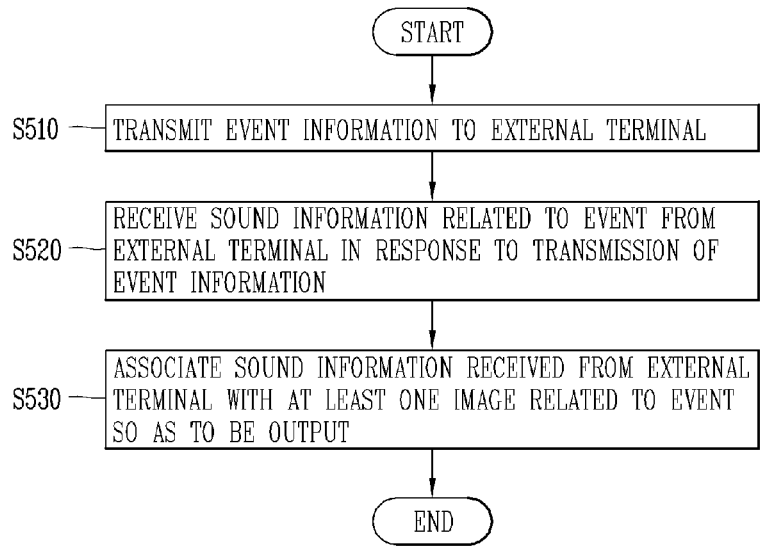
[Fig. 5]

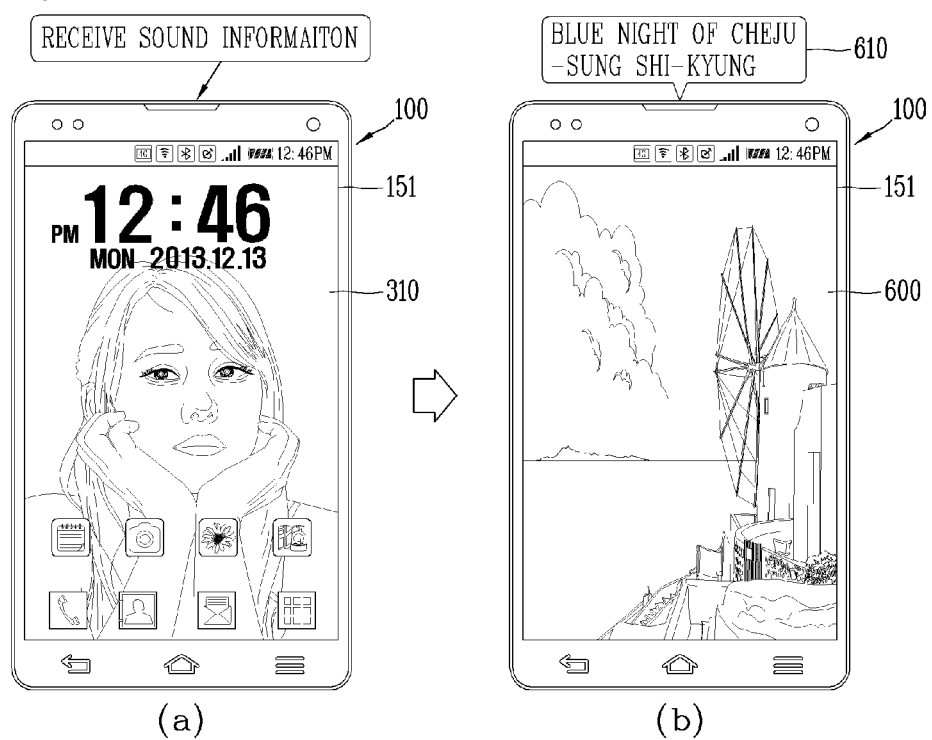

[Fig. 7a]
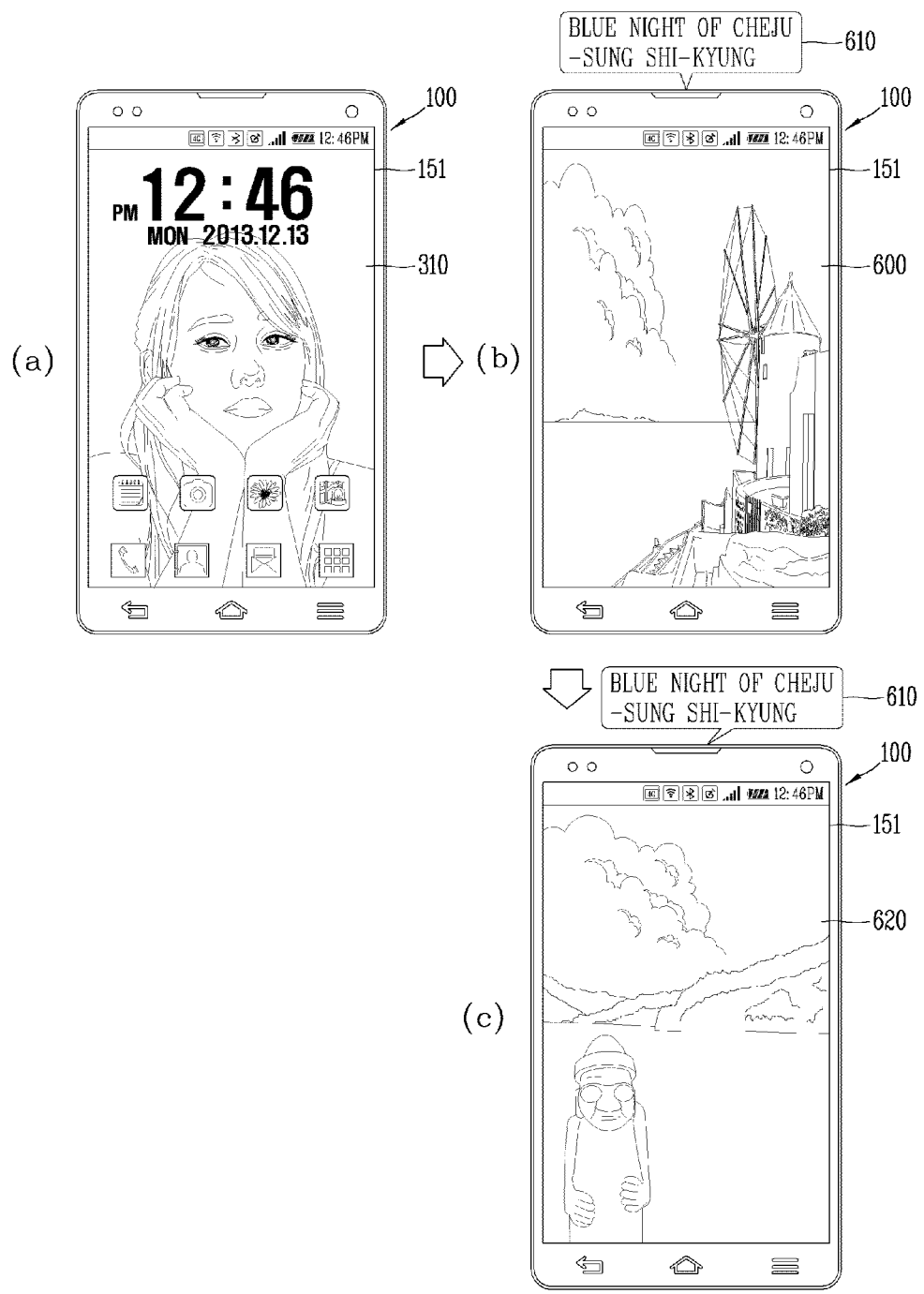

[Fig. 7b]
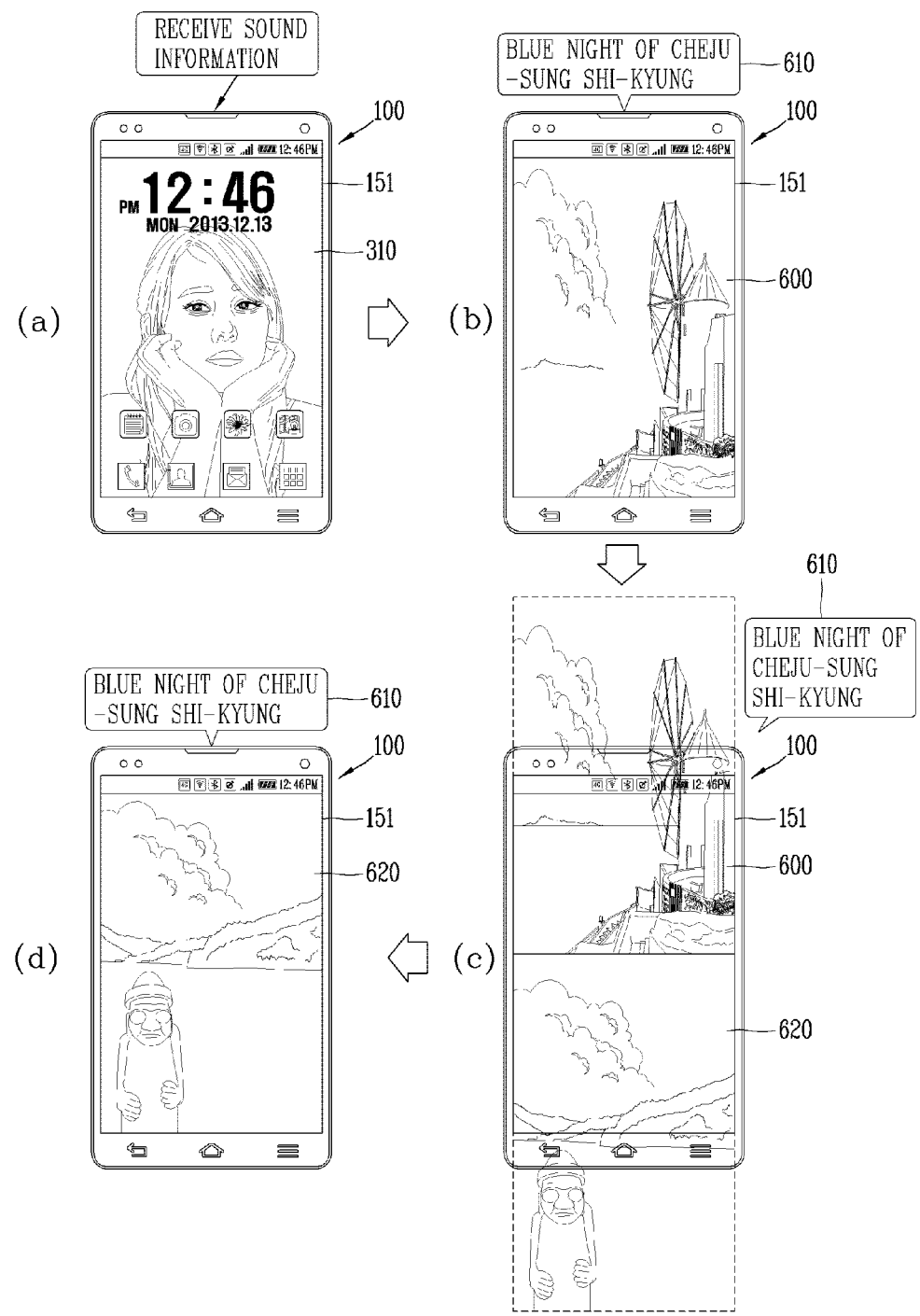

[Fig. 7c]
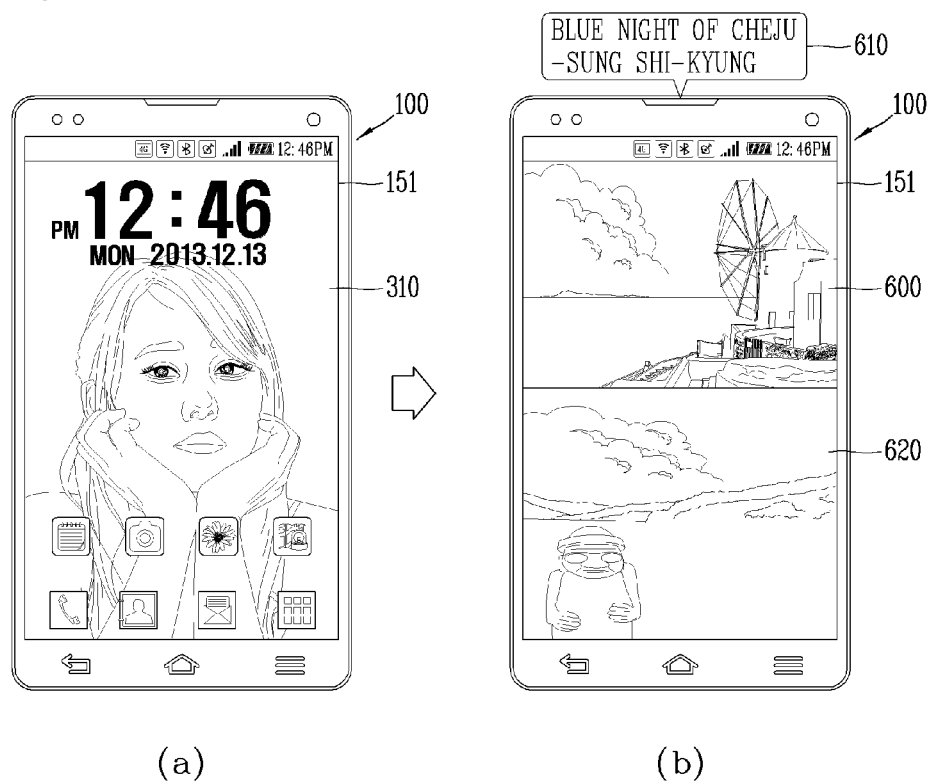

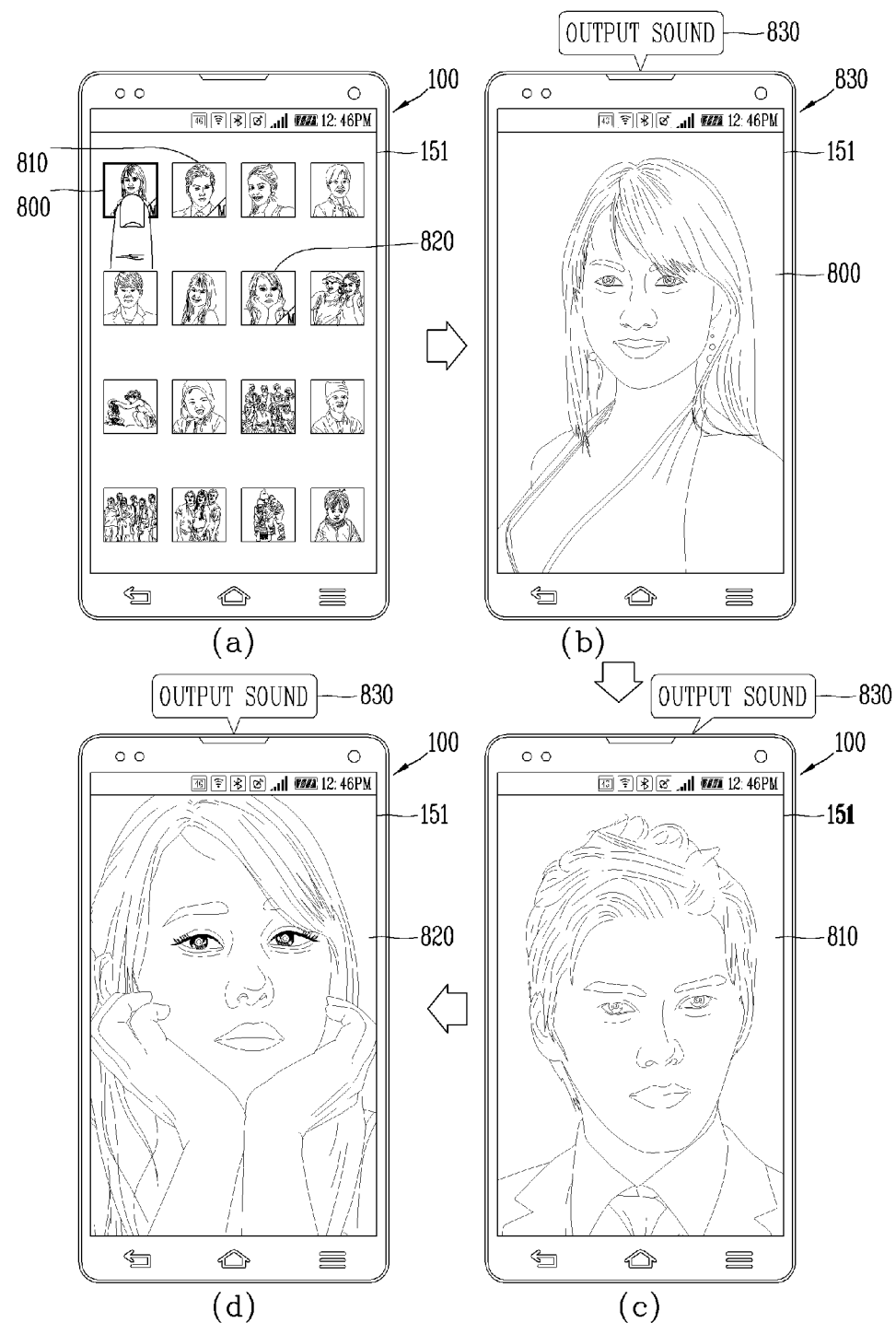
[Fig. 8]

[Fig. 9]
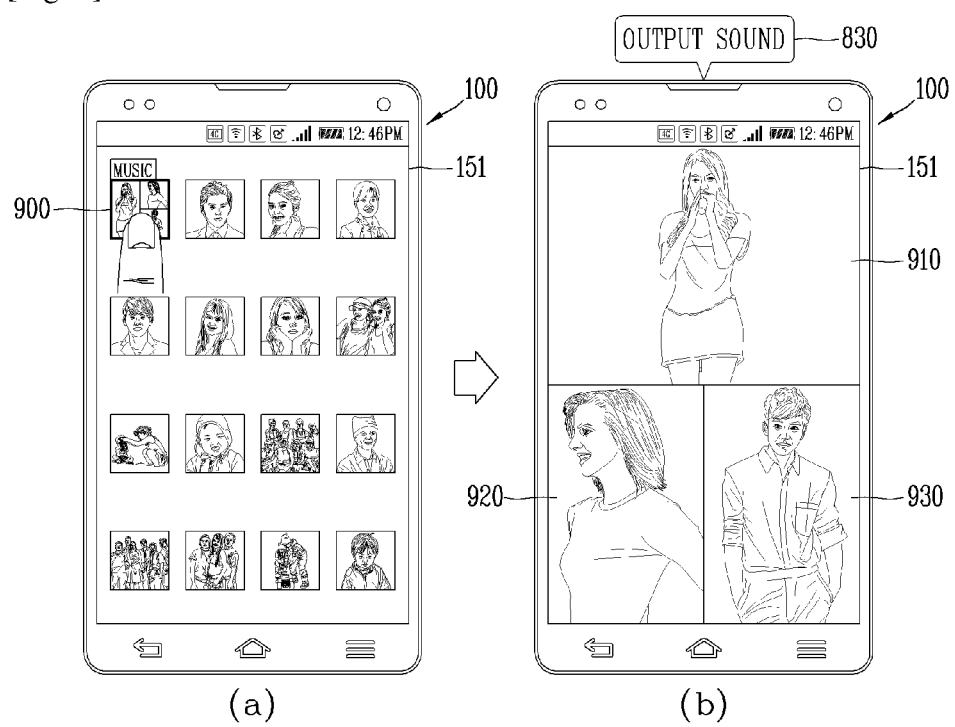

[Fig. 10a]
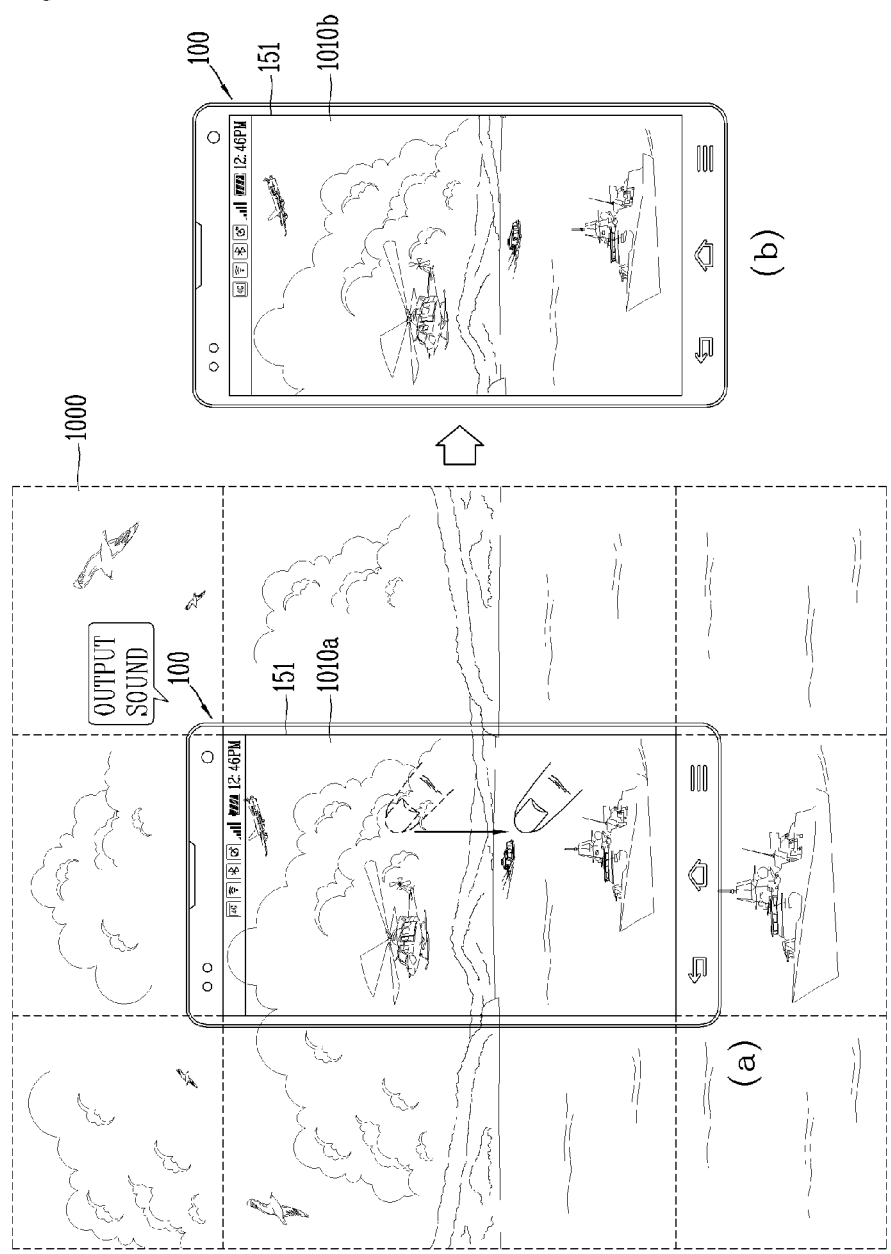

[Fig. 10b]
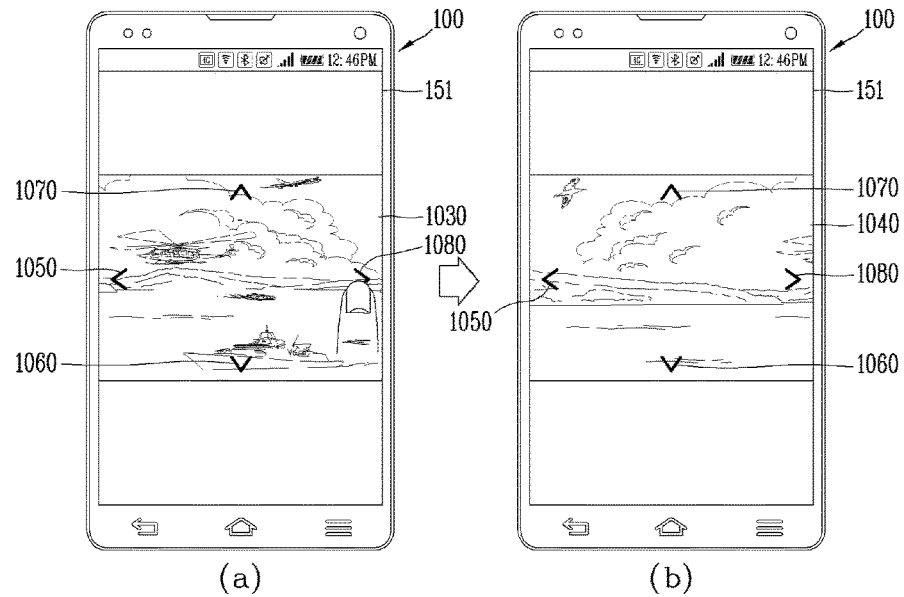
[Fig. 11]
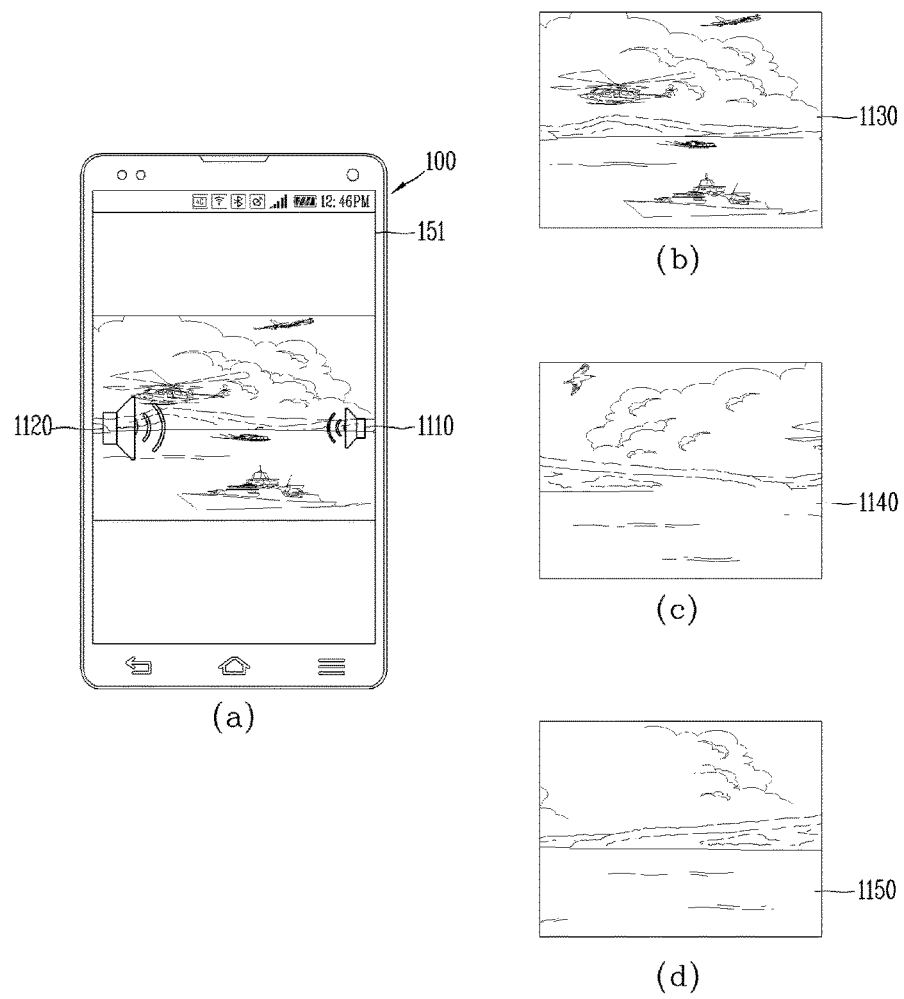

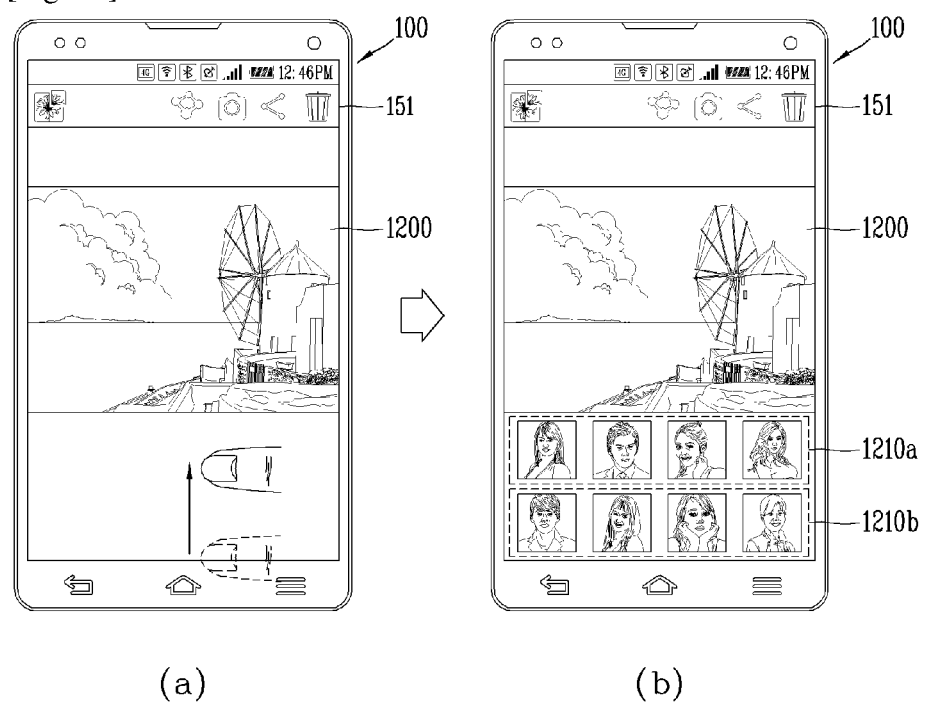
[Fig. 12]
(a)  (b)

MOBILE TERMINAL AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2014/010458, filed Nov. 3, 2014, which claims priority to Korean Patent Application No. 10-2014-0035499, filed Mar. 26, 2014, whose entire disclosures are hereby incorporated by reference.

TECHNICAL FIELD

The present disclosure relates to a mobile terminal capable of providing an emotional affinity with previous experience through sharing of media information, and a method of controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing or multimedia player function. In particular, more recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Meanwhile, various media information (e.g., image, video, and the like) may be transmitted and received between mobile terminals through wireless communication. By sharing media information, mobile terminals provide visual fun to users, as well as receiving various types of information.

Meanwhile, as mobile terminals provide media information for users, user demand for various methods providing meaningful media together has increased.

DISCLOSURE OF INVENTION

Technical Problem

Therefore, an aspect of the detailed description is to effectively provide shared media information between mobile terminals that share media information.

Also, another aspect of the detailed description is to effectively provide shared media information to provide an emotional affinity with previous experience for users.

Solution to Problem

To achieve these and other advantages and in accordance with the purpose of this specification, as embodied and broadly described herein, a mobile terminal include: a wireless communication unit configured to communicate with an external terminal wirelessly; and a controller configured to extract, when event information is received from the external terminal through the wireless communication unit, sound information related to the event, and transmit the extracted sound information to the external terminal such that the sound information is associated with at least one image related to the event of the terminal.

In an exemplary embodiment of the present disclosure, the controller may provide control such that the extracted sound information and the at least one image related to the event are displayed together on a display unit of the external terminal.

In an exemplary embodiment of the present disclosure, the controller may provide control such that at least one image associated with the extracted sound information is sequentially output to the display unit of the external terminal, together with the extracted sound information.

In an exemplary embodiment of the present disclosure, the controller may provide control such that the at least one image associated with the extracted sound information is output in different sizes to the display unit of the external terminal.

In an exemplary embodiment of the present disclosure, the mobile terminal may further include: a memory unit configured to store a plurality of still images and video, wherein the controller may analyze a still image related to the event based on the event information, and extract sound information corresponding to the analyzed still image from a video associated with the still image.

In an exemplary embodiment of the present disclosure, the video associated with the still image may be at least one among a video related to the transmitted event information and a video including the still image.

In an exemplary embodiment of the present disclosure, the extracted sound information may be uniform resource locator (URL) address information from which a sound denoted by the sound information may be downloaded.

In an exemplary embodiment of the present disclosure, the external terminal that transmits the event information may be an external terminal permitted for transmission of the event information according to a pre-set condition.

In an exemplary embodiment of the present disclosure, the pre-set condition may be an external terminal whose identification information has been checked and an external terminal authenticated in advance to transmit information related to the event.

To achieve these and other advantages and in accordance with the purpose of this specification, as embodied and broadly described herein, a mobile terminal include: a wireless communication unit configured to perform wireless communication with an external terminal; a memory unit configured to store a plurality of images; a display unit configured to display at least a portion of the plurality of images; and a controller configured to transmit event information to the external terminal through the wireless communication unit and receive sound information related to the event information, wherein the controller associates the sound information with at least one of the plurality of images.

In an exemplary embodiment of the present disclosure, when at least one image is displayed on the display unit, the controller may output the sound information together.

In an exemplary embodiment of the present disclosure, the sound information received from the external terminal may be sound information received in response to the transmission of the event information through the wireless communication unit.

In an exemplary embodiment of the present disclosure, the controller may display a graphic image denoting that the sound information is associated in one region of a thumbnail image representing each of at least one image with which the sound information is associated.

In an exemplary embodiment of the present disclosure, when a pre-set type of touch is applied to the graphic object, the controller may sequentially output the at least one image together with the sound information to the display unit.

In an exemplary embodiment of the present disclosure, an output order of the at least one image may be determined according to a pre-set condition.

In an exemplary embodiment of the present disclosure, the pre-set condition may include a point in time at which an image was captured, a date on which an image was captured, a location in which an image was captured, and a combination thereof.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Advantageous Effects of Invention

Accordingly, in an exemplary embodiment of the present disclosure, various types of media information may be conveniently viewed.

According to exemplary embodiments of the present disclosure, sound information is extracted by using event information transmitted from an external terminal, and the extracted sound information is transmitted to the external terminal, whereby an image related to the event information and the transmitted sound information may be controlled to be output together to a display unit of the external terminal. Thus, in the exemplary embodiments of the present disclosure, since a related sound is provided together with an image, a situation at the time when the image was captured can be more vividly reproduced for a user.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with the present disclosure.

FIGS. 1B and 1C are conceptual views of one example of the mobile terminal, viewed from different directions.

FIG. 2 is a flow chart illustrating a method of extracting, by a terminal which has received event information, sound information related to the event information and transmitting the extracted sound information to an external terminal.

FIG. 3 is a conceptual view illustrating the control method of FIG. 2.

FIGS. 4A and 4B are conceptual views illustrating controlling differently depending on whether sound information is to be detected when event information is received.

FIG. 5 is a flow chart illustrating a method of processing received sound information related to event information by associating the sound information with an image related to the event information.

FIG. 6 is a conceptual view illustrating the control method of FIG. 5.

FIGS. 7A, 7B, and 7C are conceptual views illustrating various methods for outputting sound information and an image together.

FIGS. 8 and 9 are conceptual views illustrating a control method when any one of images associated with sound information is displayed on a display unit.

FIGS. 10A and 10B are conceptual views illustrating displaying a composite image obtained by combining a plurality of images.

FIG. 11 is a conceptual view illustrating a method of outputting a graphic object indicating that sound information is associated when the sound information is associated.

FIG. 12 is a conceptual view illustrating a method of outputting identification information of an external terminal that shares the image.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast signal may be encoded based on at least one of standards (or broadcast types, e.g., ISO, IEC, DVB, ATSC, etc.) for transceiving digital broadcasting signals. The broadcast receiving module 111 may receive the digital broadcast signal using a method suitable for the standards.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like. Broadcast signals and/or broadcast-associated information received via the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminalsenses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, a communication system implementable through the mobile terminal 100 according to an embodiment of the present invention will be described.

First, a communication system may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Hereinafter, for the description purpose, CDMA will be described, but, obviously, the present invention is applicable to any communication system including a CDMA wireless communication system.

A CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2A, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

Also, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

Hereinafter, embodiments related to a control method that can be implemented in the mobile terminal configured as described above will be described with reference to the accompanying drawings. It is apparent to those skilled in the art that modification, alteration, and improvement can be made to the present invention within a scope that does not deviate from the nature and gist of the present invention.

FIG. 2 is a flow chart illustrating a method of extracting, by a terminal which has received event information, sound information related to the event information and transmitting the extracted sound information to an external terminal, and FIG. 3 is a conceptual view illustrating the control method of FIG. 2.

In an exemplary embodiment, in providing media information for a user, related media information may be provided together. Here, the media information may be at least one of a still image, video, and a sound. Also, the related media information may be media information set as related media according to preset conditions. For example, the media information may be media information imaged at the same time or at a similar point in time.

Meanwhile, media information may be transmitted between mobile terminals through wireless communication. Thus, media information may be shared between users of mobile terminals.

Also, a mobile terminal may obtain related media information from at least one external terminal through sharing of media information. In this case, by exchanging related media information with at least one external terminal, present disclosure may provide a method of providing the media information of the at least one external terminal and the media information stored in the memory unit 170 together.

Meanwhile, hereinafter, transmission or reception of event information and media information between two mobile terminals will be described, but the present disclosure is not limited thereto and may also be applied to a case in which information is transmitted or received between a plurality of mobile terminals.

First, the mobile terminal according to an exemplary embodiment of the present disclosure may receive event information from an external terminal in step S210.

The mobile terminal according to an exemplary embodiment of the present disclosure may include a wireless communication unit capable of performing wireless communication with an external terminal. The wireless communication may be performed in various manners and may be performed according to all of the methods described above with reference to FIG. 1A. For example, information may be transmitted and received using a data communication network (3G).

The controller 180 may receive event information from an external terminal through the wireless communication unit. Here, the event information may include a combination of meta data information or log information of media information such as a point in time at which media was imaged (or a media imaging time), a location at which a media was imaged (or a media imaging location), and a date on which a media was imaged (or a media imaging date), and the like. For example, event information (travel in Kyungjoo) may be generated by using a media imaging location (for example, Kyungjoo) and a media imaging date (for example, Mar. 1, 2014).

Also, the event information may be generated by analyzing media information. Namely, when media information is image information, the event information may be generated by analyzing the image information. For example, by analyzing the image information, character information included in the image may be detected, and event information may be generated by using the character information. Namely, in a case in which the character information is A and B, event information for detecting media information in which A and B were imaged together may be generated.

In another example, the controller 180 may detect landscape information included in the image by analyzing the image. Here, the landscape information may include object information, location information, and the like. For example, when the image includes falls, information regarding the falls may be detected through an image in which water falls, an image of rock, and the like, by analyzing the image.

In another example, the controller 180 may determine a relative position of an image determined as being the same event information by analyzing the image. For example, the controller 180 may detect information regarding a relative position of each of a plurality of images captured in the same location.

The generated event information may be used in the mobile terminal that has generated the event information or may be transmitted to an external terminal through the wireless communication unit.

Also, the event information may be received through the wireless communication from an external terminal. In this case, the external terminal that transmits the event information may be an external terminal without identification information, an external terminal authenticated according to a pre-set authentication procedure, an external terminal whose identification information is stored in the memory unit 170, and the like.

When event information is transmitted from an external terminal without identification information, the controller 180 may select whether to receive the event information. Accordingly, in an exemplary embodiment of the present disclosure, event information may be selectively received.

Meanwhile, the external terminal authenticated according to a pre-set authentication procedure may be an external terminal permitted for transmission and reception of event information. Namely, the external terminal authenticated according to a pre-set authentication procedure may be an external terminal permitted for transmission of event information before transmission of the event information. The pre-set authentication procedure may be performed in advance before transmission of the event information according to a user request.

Also, identification information of the external terminal may be phone number information of the external terminal, user account information, e-mail information, ID information, and the like. Namely, the external terminal eligible to transmit event information may be an external terminal permitted for transmission of the event information in advance by the user before transmission of the event information.

In detail, when a request for permitting transmission of event information is received, the user may determine whether to permit the transmission permission request. In this case, once the transmission permission request is granted, the external terminal may transmit event information in real time without an additional permission request.

In this manner, the user may be protected from a risk of exposing his or her media information as event information is transmitted to unspecified individuals. Also, personal information of the user may be protected.

When the event information is received, the mobile terminal according to an exemplary embodiment of the present disclosure may extract sound information related to the event based on the received event in step S220.

When the event information is received from the external terminal, the controller 180 may extract sound information related to the event based on the received event information.

The sound information may be a sound file itself, uniform resource locator (URL) address information for downloading the sound file, and the like. Also, the sound information may be a sound file itself or may be a sound file associated with a still image, a sound file extracted from video, and the like.

Extracting the sound file may be performed immediately after the event information is transmitted or may be performed according to selection of the user who has received the event information. When sound information starts to be extracted, screen information indicating that sound information is being extracted by using the event information may be displayed on the display unit 151.

Also, extracting the sound information may be performed in a background of the mobile terminal. Here, extracting the sound information in the background may refer to execution of the function without displaying screen information related to extraction of the sound information on the display unit 151 of the mobile terminal. Namely, extracting the sound information in the background may be understood as executing the function in a state in which the user does not recognize the execution of the function.

When the event information is received, the controller 180 may extract sound information by using at least one of time information, location information, image analysis information, and date information included in the event information.

Also, the controller 180 may extract state information of the mobile terminal related to the event information by using the event information. The state information of the mobile terminal may include information regarding an application being executed, position information of the mobile terminal, time information, and the like.

Here, the controller 180 may compare the event information and the state information and extract sound information. For example, the controller 180 may extract sound information being played at a time corresponding to the time information included in the event information.

Also, the controller 180 may detect a still image (for example, an image) by using the event information. In this case, the still image may be an image related to the event.

The controller 180 may extract sound information associated with the still image. The still image detected by using the event information may be associated with the sound information. Here, the sound information associated with the still image may be understood as sound information tagged to the still image. The tagged sound information may be output together when the still image is output to the display unit 151. For example, when the still image is output to the display unit 151, the sound information may be output for a predetermined period of time or a graphic object indicating that the sound information can be output, may be output to one region of the display unit 151.

Also, the controller 180 may detect a video using the event information. Here, the controller 180 may separately extract only sound information from the video.

Also, the controller 180 may extract URL address information of a sound that may be downloaded through wireless communication based on the image information through analysis information of the image. For example, in a case in which the analysis information of the image includes information regarding falls, the controller 180 may extract URL address information of a sound related to the falls. Accordingly, in the mobile terminal which has received the URL address information of the sound, the sound may be downloaded through the URL address.

When the sound information is extracted, the controller 180 may transmit the entirety of the sound information or a portion of the extracted sound information. In this case, a portion of the extracted sound information may be set by the user or may be set based on event information.

For example, in a case in which a portion of the sound information is set by the user, screen information for selecting the portion of the sound information may be displayed on the display unit 151.

In another example, in a case in which a portion of the sound information is set based on event information, the set sound information may be a section of the sound information most appropriate for the event information based on the event information. For example, the portion of the sound information may be sound information section of a time slot similar to time information indicated in the event information.

When the sound information is extracted, the mobile terminal according to an exemplary embodiment of the present disclosure may transmit the sound information to the external terminal such that the extracted sound information is associated with an image related to the event information in the external terminal which has transmitted the event information in step S230.

The controller 180 may transmit the extracted sound information to the external terminal which has transmitted the event information, through the wireless communication unit. In this case, the controller 180 may control the external terminal such that the extracted sound information is associated with an image related to the event information stored in the external terminal.

In detail, in a case in which the image related to the event information is displayed in the external terminal which has transmitted the event information, the controller 180 may provide control such that the extracted sound information is output together.

Also, the controller 180 may associate the extracted sound information with at least one image of the external terminal. In this case, the controller 180 may control the external terminal to sequentially output the at least one image together with the extracted sound information.

In detail, while the at least one image is sequentially being output, the controller 180 may provide control such that the extracted sound information is output together.

The controller 180 may receive event information from the external terminal through the wireless communication unit. In this case, the mobile terminal may be in a state in which a portion of a plurality of applications is being executed or none of the plurality of applications is executed (namely, in an standby state or an idle state).

For example, as illustrated in (a) of FIG. 3, the mobile terminal according to an exemplary embodiment may be in an idle state. In this case, a home screen page 310 may be output on the display unit 151.

When the event information is transmitted, the controller 180 may extract sound information related to the event. In this case, the controller 180 may extract the sound information in a background such that the user may not recognize the extraction of the sound information. Alternatively, as illustrated in (b) of FIG. 3, the controller 180 may display information 320 indicating that the sound information is being extracted on the display unit 151 for user's recognition of the extraction of the sound information In addition, as illustrated in (c) of FIG. 3, when the sound information is extracted, the controller 180 may transmit the extracted sound information to the external terminal which has transmitted the event information. In this case, the controller 180 may display information 330 indicating that the extracted sound information is being transmitted on the display unit 151.

So far, the method of extracting sound information based on event information received from an external terminal and transmitting the extracted sound information to the external terminal to allow the sound information to be associated with an image related to the event information has been described. In this manner, the mobile terminal according to an exemplary embodiment of the present disclosure may receive sound information from an external terminal and provide the received sound information together with an image related to an event of its own, as well as sound information of the mobile terminal.

Hereinafter, a control method according to whether a sound is to be detected when event information is received will be described. FIGS. 4A and 4B are conceptual views illustrating controlling differently depending on whether sound information is to be detected when event information is received.

When event information is received from an external terminal, the controller 180 may output screen information 340 inquiring whether to detect sound information according to the event information. For example, as illustrated in (a) of FIG. 4A, the controller 180 may output information 340 indicating whether to detect sound information by using the received event information to a pop-up window. In this case, as illustrated in (a) of FIG. 4A, when a control command to detect the sound information is received, the controller 180 may detect the sound information.

When the sound information is detected, screen information indicating that the sound has been detected may be displayed. For example, as illustrated in (b) of FIG. 4A, the detected sound information list 350 may be displayed on the display unit 151.

The controller 180 may detect a plurality of pieces of sound information. In this case, the controller 180 may transmit a portion of the plurality of pieces of sound information to the external terminal such that the portion of the plurality of pieces of sound information is associated with an image related to the event. When the sound information is transmitted, screen information 360 indicating that the sound information has been transmitted may be output on one region of the display unit 151.

Meanwhile, as illustrated in (a) of FIG. 4B, when a control command to not detect the sound information is received, even though the event information is received, the controller 180 may not detect the sound information. For example, in a case in which the event information is received so screen information 340 inquiring whether to detect the sound information related to the event information is displayed, the user may not detect the sound information through a control command to not detect the sound information.

So far, the method of determining whether to detect sound information when event information is received has been described. In this manner, sound information may be detected according to a user request.

Hereinafter, a method of transmitting event information to an external terminal, receiving sound information related to the event information in response to the event information, and associating the received sound information with an image related to the event information, and processing the same, in the mobile terminal which has received the sound information will be described. FIG. 5 is a flow chart illustrating a method of processing received sound information related to event information by associating the sound information with an image related to the event information, and FIG. 6 is a conceptual view illustrating the control method of FIG. 5.

The mobile terminal according to an exemplary embodiment of the present disclosure may transmit event information in step S510.

The event information may be information including a time, a location, a date set by the user and combinations thereof. In this case, the event information may be generated through image analysis or by the user.

When a control command to transmit event information is received from the user, the controller 180 may transmit the event information to the external terminal through the wireless communication unit. In this case, the external terminal that receives the event information may be an external terminal whose identification information is checked, an external terminal permitted for transmission of event information in advance, and the like. The prior permission of event information may be performed in the same manner as that of the authentication procedure described above.

Thereafter, the mobile terminal according to an exemplary embodiment of the present disclosure may receive sound information related to the event information from the external terminal to which the event information was transmitted, in response to the transmission of the event information in step S520.

After transmitting the event information, the controller 180 may receive sound information related to the event information from the external terminal to which the event information was transmitted. Namely, the controller 180 may receive sound information from the external terminal such that the sound information stored in a memory unit 170 of the external terminal may be used, as well as using the still image, video, and sound information stored in the memory unit 170 of the mobile terminal.

When the sound information is received from the external terminal, the mobile terminal according to an exemplary embodiment of the present disclosure may associate the sound information received from the external terminal with at least one image related to the event so as to be output in step S530.

When the sound information related to the event information is received, the controller 180 may detect at least one still image (or an image) related to the event information. In this case, the controller 180 may process the at least one still image to be output together with the sound information. Here, the at least one still image may be an image stored in the memory unit 170.

For example, as illustrated in (a) and (b) of FIG. 6, in a case in which any one image 600 among at least one image associated with sound information 610 is displayed in the entire region of the display unit 151, the controller 180 may automatically output the sound information 610.

In this manner, the user may view the image and sound information stored in the external terminal together, in addition to the image and a sound stored in the memory unit 170 of the mobile terminal of his own. Thus, the present disclosure may provide various experiences for users, and effectively provide images.

So far, the method of providing the sound information together when providing an image related to an event, by receiving the sound information from the external terminal has been described.

Hereinafter, various methods of outputting sound information and an image together will be described. FIGS. 7A, 7B, and 7C are conceptual views illustrating various methods for outputting sound information and an image together.

When sound information is received from an external terminal, the controller 180 may associate the received sound information with at least one image stored in the memory unit 170 so as to be output together.

The at least one image and the sound information may be output in various manners. Here, in a case in which a plurality of images are associated with the sound information, the controller 180 may sequentially output the plurality of images according to pre-set conditions. Here, the pre-set conditions may include a point in time at which an image was captured, a location in which the image was captured, and a date on which the image was captured, and a combination thereof. For example, the controller 180 may sequentially output the images to the display unit 151 in order of points in time at which the plurality of images were captured.

For example, as illustrated in (a) of FIG. 7A, in a case in which sound information is received, the controller 180 may output at least one image 00 and 620 associated with the sound information 610.

In this case, as illustrated in (b) and (c) of FIG. 7A, the controller 180 may sequentially output the at least one image 600 and 620 associated with the sound information 610 in order of points in time at which the image were captured. Accordingly, the user may be provided with images as if he or she views a piece of music video, together with a sound.

Also, in a case in which a plurality of images are associated with the received sound information and processed, the controller 180 may output the plurality of images such that they are automatically moved. Namely, while the sound is being output, the controller 180 may output a state in which the plurality of images are moved, to the display unit 151.

For example, as illustrated in (a) and (b) of FIG. 7B, when the sound information 610 is received, the controller 180 may output at least one image associated with the sound information 610.

In this case, as illustrated in (c) of FIG. 7B, the controller 180 may make a portion of the image 600 currently output on the display unit 151 disappear from the display unit 151, and output a portion of an image 620 different from the image currently output on the display unit 151, by a region corresponding to the disappeared region. Namely, portions of at least two images 600 and 620 may be displayed together on the display unit 151.

Thereafter, as illustrated in (d) of FIG. 7B, the image 620 may be displayed in the entire region of the display unit 151.

Also, the controller 180 may output the plurality of images associated with the sound information 610 at a time. In this case, the plurality of images may be displayed in different sizes or in the same size. Meanwhile, in a case in which the plurality of images are displayed in different sizes, the sizes of the images may be changed according to pre-set conditions or randomly.

For example, as illustrated in (a) and (b) of FIG. 7C, when sound information is received, the controller 180 may simultaneously display the plurality of images 600 and 620 related to the event information, together with the sound information 610.

So far, the method of displaying a plurality of images together with the sound information, when the sound information is received from an external source has been described. In this manner, with sound information together with a plurality of images, the user can be provided with images vividly reproducing memories at the time when the images were captured.

Hereinafter, a control method in a case in which any one of images associated with sound information is displayed on the display unit will be described.

FIGS. 8 and 9 are conceptual views illustrating a control method when any one of images associated with sound information is displayed on a display unit.

When an application for executing a function to display an image is executed, the controller 180 may output a plurality of thumbnail images representing a portion of a plurality of images stored in the memory unit 170 to the display unit 151.

In this case, as illustrated in (a) of FIG. 8, in thumbnail images 800, 810, and 820 of images associated with sound information, among the plurality of thumbnail images, graphic objects denoting that the sound information is associated may be displayed.

Also, as illustrated in (b) and (d) of FIG. 8, when a touch is applied to the graphic object, the controller 180 may output all of the images 810 and 820 associated with the sound information, as well as the image 800 to which the touch has been applied. In this case, in order to output the images associated with the sound information, all the method described above with reference to FIGS. 7A, 7B, and 7C may be used. For example, as illustrated in (b) and (d) of FIG. 8, the controller 180 may sequentially output the plurality of images 800, 810, and 820.

Also, the plurality of images associated with the sound information may be displayed in a single folder image 900. For example, as illustrated in (a) of FIG. 9, the plurality of images 910, 920, and 930 may be displayed together in the folder image 900 including a plurality of images associated with the sound information 830.

In this case, when a user's touch is applied to the folder image 900, the plurality of images 910, 920, and 930 may be arranged in different sizes in the entire region of the display unit 151. In this case, the sizes of the plurality of images may be changed randomly or according to pre-set conditions and a user selection.

So far, the method of displaying a plurality of images associated with sound information has been described. Hereinafter, a method of generating a composite image by using a plurality of images associated with sound information and displaying the same will be described. FIGS. 10A and 10B are conceptual views illustrating displaying a composite image obtained by combining a plurality of images.

In a case in which a plurality of images are associated with sound information, the controller 180 may generate a composite image 1000 by combining the plurality of images. In this case, various generally known combining methods, such as a focusing method, a method of combining overlapping images through image analysis, and the like, may be used.

Meanwhile, as illustrated in (a) of FIG. 10A, the controller 180 may output a portion 1010a of the composite image 1000 to the display unit 151. Here, the controller 180 may display a portion of a region, not currently displayed on the display unit, of the composite image on the display unit 151 according to a direction of a touch applied to the display unit 151.

For example, as illustrated in (b) of FIG. 10A, in response to a drag direction of the user, a portion 1010b of the region, not currently displayed on the display unit 151, of the composite image 1000 may be displayed.

Meanwhile, in a case in which an image output on the display unit 151 is a composite image 1030 obtained by combining a plurality of images, the controller 180 may output graphic objects 1050, 1060, 1070, and 1080 denoting the composite image 1030, together. For example, as illustrated in (a) of FIG. 10B, the controller 180 may output the plurality of graphic objects 1050, 1060, 1070, and 1080 denoting that there is an image 1040 not currently output in upper, lower, left, and right sides based on the image 1030 currently output to the display unit 151.

Also, in response to a touch applied to the graphic object 1080 among the plurality of graphic objects 1050, 1060, 1070, and 1080, the controller 180 may output the image 1040 in a direction denoted by the graphic object 1080.

Also, besides a touch applied to the graphic objects 1050, 1060, 1070, and 1080, the controller 180 may change the image 1040 output on the display unit 151 according to a tilt of the terminal and relative positions of the terminal and the user's pupil.

In this manner, the user may view the composite image including an image received from an external source, together with a sound, as well as images stored in the memory unit 170.

Hereinafter, a method of outputting a graphic object denoting association of sound information when the sound information is associated will be described. FIG. 11 is a conceptual view illustrating a method of outputting a graphic object indicating that sound information is associated when the sound information is associated.

When an image is associated with sound information, the controller 180 may output graphic objects 1110 and 1120 denoting that the sound information is associated with the image in a region of the image. The graphic objects 1110 and 1120 may have various shapes, and shapes of the graphic objects 1110 and 1120 may be selected by the user. Accordingly, the user may recognize that a sound is associated with the image and play the sound through the graphic objects.

Also, the controller may determine a size and an output position of the graphic objects 1110 and 1120 depending on correlation between the voice and the image.

For example, as illustrated in FIG. 11, at least two associated images may be stored in the memory unit 170 or may be received from an external terminal.

In this case, the controller 180 may analyze the associated images. The controller 180 may determine relative positions of the images by using image analysis information obtained by analyzing the images. The relative positions of the images may be relative positions of locations of the images. For example, referring to FIG. 11, as for the three images, based on a first image 1130, the image 1150 may be an image positioned on the left side of the location of the first image 1130 and the image 1140 may be an image positioned on the right side of the location of the first image 1130. Namely, by using the image analysis information, the controller 180 may determine relative positions of the images.

Also, the controller 180 may extract a sound from the images whose relative positions have been determined. In this case, the controller 180 may associate the extracted sound to any one image 1130 among the images 1130, 1140, and 1150 whose relative positions have been determined.

Here, the controller 180 may determine output positions of the graphic objects 12110 and 1120 denoting that a sound is associated, according to the relative positions of the images. For example, when the image 1130 among the images 1130, 1140, and 1150 whose relative positions have been determined is associated with the sound, the controller 180 may output a graphic object to a position corresponding to the relative position of the image from which a sound has been extracted. For example, based on the image 1130, when the image from which the sound has been extracted is on the right side 1150, the graphic object 1110 may be output to a right side of the image 1130.

Also, the controller 180 may determine a size of the graphic object depending on a distance, as well as the relative positions of the image 1130 and the image from which the sound has been extracted. For example, as a distance between the image 1130 and a related image is longer, the graphic object is displayed to be smaller, and as the distance is shorter, the graphic object may be displayed to be larger. In this case, the size of the graphic object may be set in advance depending on an absolute distance.

So far, the method of displaying a graphic object denoting that a sound is associated with an image has been described. In this manner, the user may recognize a relationship between an image associated with a sound and an image from which a sound has been extracted, and well as recognizing that the sound is associated with the image.

Hereinafter, a method of informing about an external terminal that shares an image will be described. FIG. 12 is a conceptual view illustrating a method of outputting identification information of an external terminal that shares the image.

In a state in which an image 1200 is output on the display unit 151, when a pre-set type of touch is applied, the controller 180 may output identification information of an external terminal that shares the image 1200 together. For example, as illustrated in FIG. 12, in a case in which a sound associated with the image 1200 is received from a person "A", the controller 180 may output identification information of the person "A" based on an applied pre-set type of touch.

Here, the pre-set type of touch may be a drag or a flicking touch applied in a pre-set direction.

Also, the controller 180 may output identification information of at least one external terminal associated with the image 1200, among a plurality of external terminals. Here, the plurality of external terminals may be terminals permitted to share media information as described above.

The at least one external terminal associated with the image 1200 may be may be an external terminal that satisfies at least one condition, among an external terminal in which the image 1200 is currently output on the display unit 151, an external terminal related to character information included in the image 1200, and an external terminal that has transmitted sound information associated with the image 1200.

Also, the controller 180 may output the identification information of the external terminal as an image. For example, as illustrated in (a) and (b) of FIG. 12, when a preset type of touch is applied, the controller 180 may output identification information of the external terminal, as image information.

Also, the controller 180 may classify the identification information in a folder form according to pre-set reference and output the same. For example, as illustrated in (b) of FIG. 12, the controller may classify an image denoting character information included in the image and an image 1210b denoting identification information of an external terminal that currently outputs the image to the display unit, and output the same.

Also, in a state in which a plurality of images are output, when a touch is applied to any one of the plurality of images, the controller 180 may execute a function related to the any one image. Here, the related function may be a function to detect and output an image related to the identification information denoted by the image.

For example, when a touch is applied to any one of the plurality of images, a new image including the identification information of the any one image may be output to the display unit.

Accordingly, in an exemplary embodiment of the present disclosure, various types of media information may be conveniently viewed.

According to exemplary embodiments of the present disclosure, sound information is extracted by using event information transmitted from an external terminal, and the extracted sound information is transmitted to the external terminal, whereby an image related to the event information and the transmitted sound information may be controlled to be output together to a display unit of the external terminal. Thus, in the exemplary embodiments of the present disclosure, since a related sound is provided together with an image, a situation at the time when the image was captured can be more vividly reproduced for a user.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
   a wireless communication unit configured to communicate with an external terminal wirelessly; and
   a controller configured to:
   extract, when event information is received from the external terminal through the wireless communication unit, sound information related to the event, and transmit the extracted sound information to the external terminal such that the sound information is associated with at least one image related to the event of the terminal,
   wherein the sound information is outputted at the external terminal when the sound information is received at the external terminal,
   wherein when the sound information is outputted at the external terminal, a first screen displayed on a display unit of the external terminal is changed to a second screen corresponding to the at least one image related to the event of the terminal, the at least one image related to the event being extracted from a memory of the external terminal in response to the receipt of the sound information.

2. The mobile terminal of claim 1, wherein the controller provides control such that the extracted sound information and the at least one image related to the event are outputted together on the display unit and to a speaker of the external terminal.

3. The mobile terminal of claim 2, wherein the controller provides control such that at least one image associated with the extracted sound information is sequentially output to the display unit of the external terminal, together with the extracted sound information.

4. The mobile terminal of claim 2, wherein the controller provides control such that the at least one image associated with the extracted sound information is output in different sizes to the display unit of the external terminal.

5. The mobile terminal of claim 1, further comprising:
   a memory unit configured to store a plurality of still images and video,
   wherein the controller analyzes a still image related to the event based on the event information, and extracts sound information corresponding to the analyzed still image from a video associated with the still image.

6. The mobile terminal of claim 4, wherein the video associated with the still image is at least one among a video related to the transmitted event information and a video including the still image.

7. The mobile terminal of claim 1, wherein the extracted sound information is uniform resource locator (URL)

address information from which a sound denoted by the sound information is downloaded.

8. The mobile terminal of claim 1, wherein the external terminal that transmits the event information is an external terminal permitted for transmission of the event information according to a pre-set condition.

9. The mobile terminal of claim 6, wherein the pre-set condition is an external terminal whose identification information has been checked and an external terminal authenticated in advance to transmit information related to the event.

10. A mobile terminal comprising:
a wireless communication unit configured to perform wireless communication with an external terminal;
a memory unit configured to store a plurality of images;
a display unit configured to display a first screen; and
a controller configured to transmit event information to the external terminal through the wireless communication unit and receive sound information related to the event information from the external terminal, the sound information being extracted from the external terminal in response to the transmission of the event information,
wherein, when the sound information is received, the controller is further configured to:
detect, from the memory unit, at least a portion of the plurality of images to be associated,
associate the sound information with the at least a portion of the plurality of images and display the at least a portion of the plurality of images, and
when the sound information is outputted, change the first screen to a second screen corresponding to the at least a portion of the plurality of images related to the event.

11. The mobile terminal of claim 10, wherein the sound information received from the external terminal is sound information received in response to the transmission of the event information through the wireless communication unit.

12. The mobile terminal of claim 10, wherein the controller displays a graphic image denoting that the sound information is associated in one region of a thumbnail image representing each of at least one image with which the sound information is associated.

13. The mobile terminal of claim 12, wherein when a pre-set type of touch is applied to the graphic object, the controller sequentially outputs the at least one image together with the sound information to the display unit.

14. The mobile terminal of claim 13, wherein an output order of the at least one image is determined according to a pre-set condition.

15. The mobile terminal of claim 14, wherein the pre-set condition includes a point in time at which an image was captured, a date on which an image was captured, a location in which an image was captured, and a combination thereof.

* * * * *